US006886291B1

(12) United States Patent
Jaggers (10) Patent No.: US 6,886,291 B1
(45) Date of Patent: May 3, 2005

(54) MINNOW BUCKET WITH AUTOMATIC MINNOW DISPENSER (76) Inventor: Houston Jaggers, 202 E. Babb Rd., Eaton, IN (US) 47338

( * ) Notice: Subject to any disclaimer, the term of this patent is extended or adjusted under 35 U.S.C. 154(b) by 49 days.

(21) Appl. No.: 10/734,025

(22) Filed: Dec. 11, 2003

(51) Int. Cl.$^7$ ............................................ A01K 97/04
(52) U.S. Cl. .................. 43/56; 43/55; 43/57
(58) Field of Search ................ 43/55, 56, 57

(56) References Cited

U.S. PATENT DOCUMENTS

| | | | | |
|---|---|---|---|---|
| 1,385,792 A | * | 7/1921 | Petty | 43/55 |
| 1,986,742 A | * | 1/1935 | Mosher | 43/55 |
| 2,330,870 A | * | 10/1943 | Collier | 43/56 |
| 2,474,745 A | * | 6/1949 | Lewis | 43/56 |
| 2,498,795 A | * | 2/1950 | Davis | 222/364 |
| 2,531,628 A | * | 11/1950 | Bride et al. | 43/56 |
| 2,663,115 A | * | 12/1953 | McKissack | 43/57 |
| 2,767,509 A | * | 10/1956 | Hopkins | 43/57 |
| 2,767,510 A | * | 10/1956 | Breithaupt | 43/57 |
| 2,963,814 A | * | 12/1960 | Zabrocki | 43/56 |
| 2,966,758 A | * | 1/1961 | Riedel | 43/56 |
| 3,000,132 A | * | 9/1961 | Koistinen | 43/56 |
| 3,002,312 A | * | 10/1961 | Vester | 43/56 |
| 3,212,210 A | * | 10/1965 | Schmelzer, Jr. | 43/57 |
| 3,372,784 A | * | 3/1968 | Ross et al. | 194/215 |
| 3,726,039 A | * | 4/1973 | Borrelli | 43/56 |
| 3,831,310 A | * | 8/1974 | Frangullie | 43/56 |
| 3,834,062 A | * | 9/1974 | Nalepka | 43/56 |
| 3,955,306 A | * | 5/1976 | Handa | 43/56 |
| 4,030,227 A | * | 6/1977 | Oftedahl | 43/56 |
| 4,037,349 A | * | 7/1977 | Key | 43/57 |
| 4,226,338 A | * | 10/1980 | Schweim | 222/162 |
| 4,686,788 A | | 8/1987 | Hartman | 43/56 |
| 4,759,148 A | * | 7/1988 | Love | 43/54.1 |
| 4,763,438 A | * | 8/1988 | Saliaris | 43/56 |
| 4,787,169 A | * | 11/1988 | Maxfield et al. | 43/57 |
| 5,109,625 A | * | 5/1992 | Skrede | 43/56 |
| 5,228,231 A | * | 7/1993 | Larson | 43/56 |
| 5,319,877 A | * | 6/1994 | Hagan | 43/54.1 |
| 5,549,227 A | * | 8/1996 | Klotz | 222/461 |
| 5,799,435 A | * | 9/1998 | Stafford | 43/57 |
| 5,802,760 A | * | 9/1998 | Campbell | 43/57 |
| 6,032,404 A | * | 3/2000 | Cincibus | 43/55 |
| 6,357,169 B1 | * | 3/2002 | Gouge | 43/56 |

FOREIGN PATENT DOCUMENTS

| | | | |
|---|---|---|---|
| DE | 30366 | * | 9/1964 |
| JP | 5-56735 | * | 3/1993 |

* cited by examiner

Primary Examiner—Peter M. Poon
Assistant Examiner—David Parsley
(74) Attorney, Agent, or Firm—Sommer Barnard Attorneys, PC (57) ABSTRACT A minnow bucket that includes a bucket base and an automatic dispensing device positioned inside the bucket base that when raised on a vertical axis in relation to the bucket base dispenses at least one minnow. The minnow bucket may also include a lid that is connected with the bucket base. The automatic dispensing device may comprise a minnow tray that is connected with a minnow tray handle. The handle is used by an angler to cause the automatic dispensing device to dispense minnows.

2 Claims, 8 Drawing Sheets

MINNOW BUCKET WITH AUTOMATIC MINNOW DISPENSER

BACKGROUND OF THE INVENTION

1. Technical Field

The present invention relates broadly to minnow buckets and more particularly, to a minnow bucket including an automatic minnow dispenser that is operable to quickly provide an angler with a minnow when needed.

2. Related Art

Almost for as long as the sport of fishing has existed, anglers have used live bait to catch fish. The use of live bait presents a problem for the angler as live bait needs to be kept alive in a container so that there is easy access. Originally, minnow buckets were simply a pail that held water and minnows. The pail was kept either in the boat or on shore. To extend the life of the minnows, the angler may exchange the old water in the pail for fresh water from the lake or stream.

Eventually minnow buckets were developed that floated in the lake or stream. These floating minnow buckets completely encased the minnows inside the buckets. They included holes through the sidewalls that allowed for the free exchange of water inside the pail with water outside the pail. Sometimes water is exchanged by pouring the water out through the holes and then placing the bucket back in the water to refill the bucket. The exchange of water, however, usually occurs when the water outside the pail moved relative to the pail. Such an occurrence would take place when the angler trolled in a lake or remained stationary in a stream.

One problem with existing minnow buckets is being able to provide the angler with easy access to the minnows contained in the minnow bucket. The angler does not want to spend lots of time chasing minnows around in the minnow bucket. In addition, with some existing minnow buckets the angler cannot see or can barely see the minnows once their hand is placed inside the minnow bucket. As such, a need exists for a minnow bucket that is capable of providing a minnow to the angler without the angler having to "fish" around for one in the minnow bucket.

SUMMARY

The present invention discloses a minnow bucket that includes an automatic minnow dispensing device. The automatic minnow dispensing device allows an angler to quickly and easily obtain minnows that are housed in a bucket base. In order to obtain a minnow, the angler raises the automatic dispensing device to a predetermined point in relation to the bucket base and at least one minnow is dispensed to the angler. The automatic dispensing device comprises a minnow tray that is connected with a minnow tray handle. The minnow tray handle is used by the angler to raise the automatic dispensing device.

The minnow tray is preferentially formed having a concave shape that slopes towards a minnow tray opening. In addition, the minnow tray preferentially includes a plurality of apertures that allow water contained in the bucket base to pass back into the bucket base when the automatic dispensing device is raised. When the automatic dispensing device reaches the predetermined point on the bucket base, an opening is included that allows the minnow to pass from the minnow tray to a minnow dispenser chute on the bucket base. The minnow then travels down the minnow dispenser chute into the angler's hand.

The minnow bucket may also include an air pump that is connected with a lid of the minnow bucket. The air pump is connected with an air diffuser that is used to aerate water that is contained in the bucket base. In addition, the minnow bucket may include a plurality of guide rails that are used to guide the minnow tray up and down an inside diameter of the bucket base. The guide rails fit inside guide slots located on the minnow tray. The lid of the minnow bucket may also include a minnow return that is used to place minnows in the bucket base.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
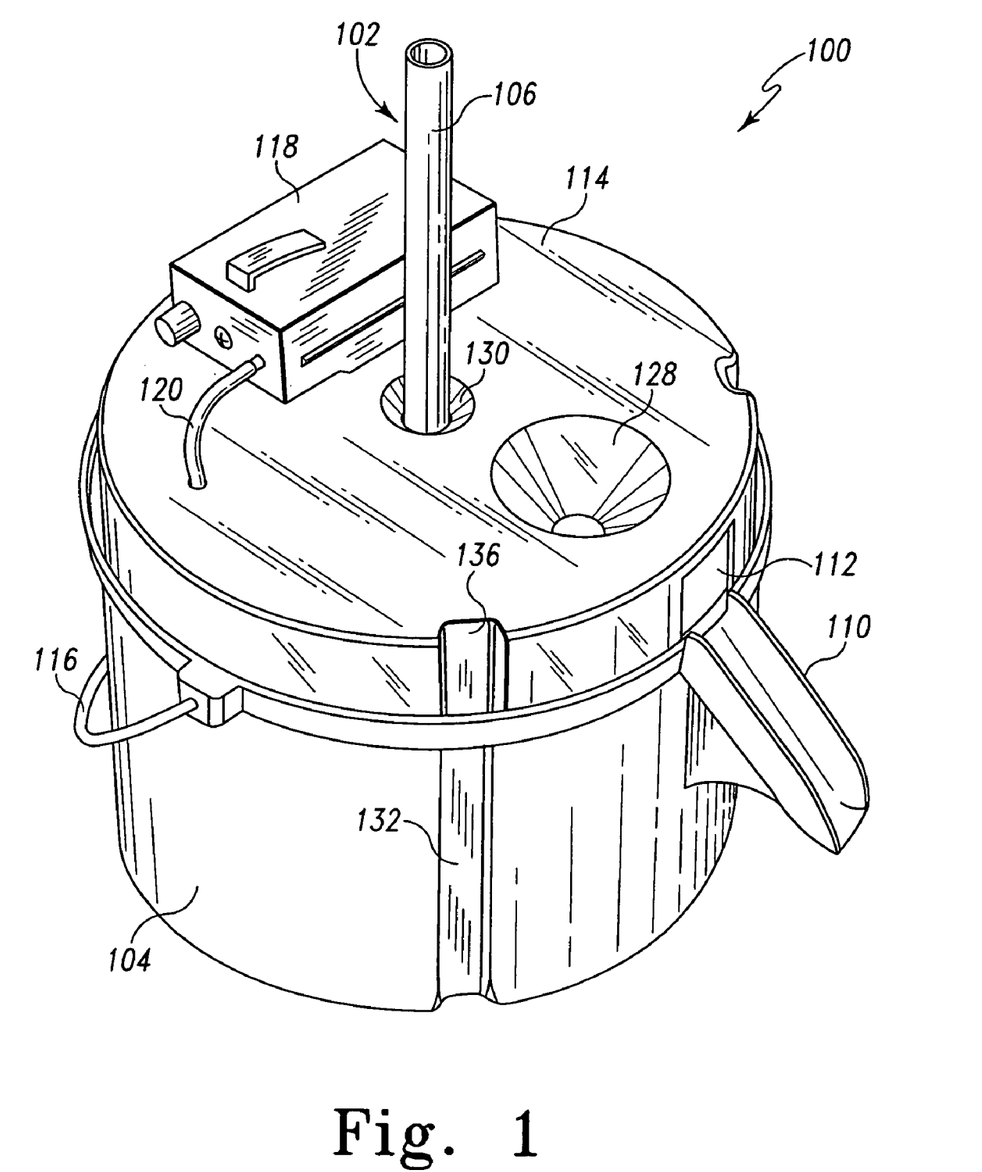
FIG. 1 is a perspective view of a minnow bucket including an automatic dispensing device.
Figure 2:
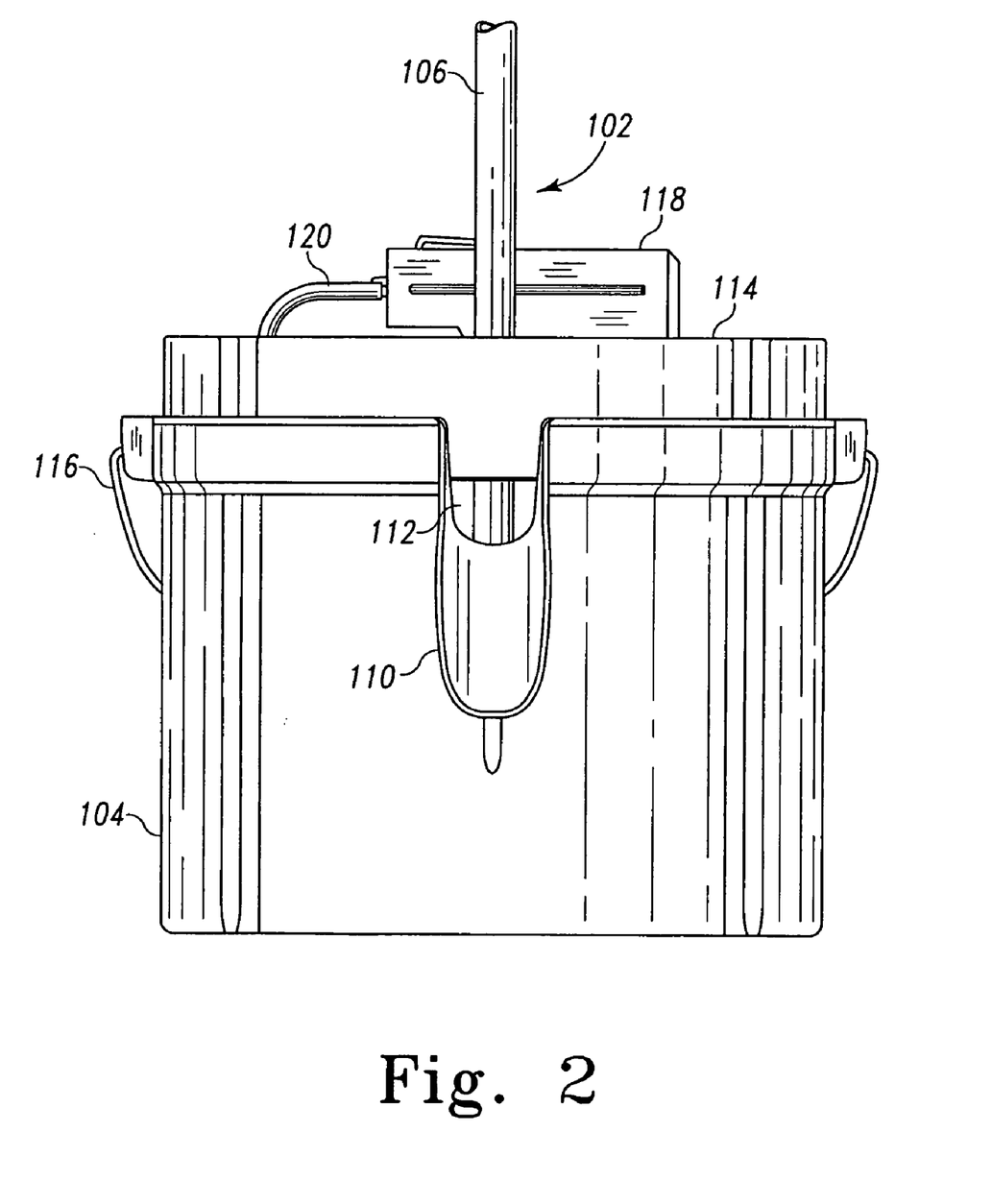
FIG. 2 is a front view of the minnow bucket illustrated in FIG. 1.
Figure 3:
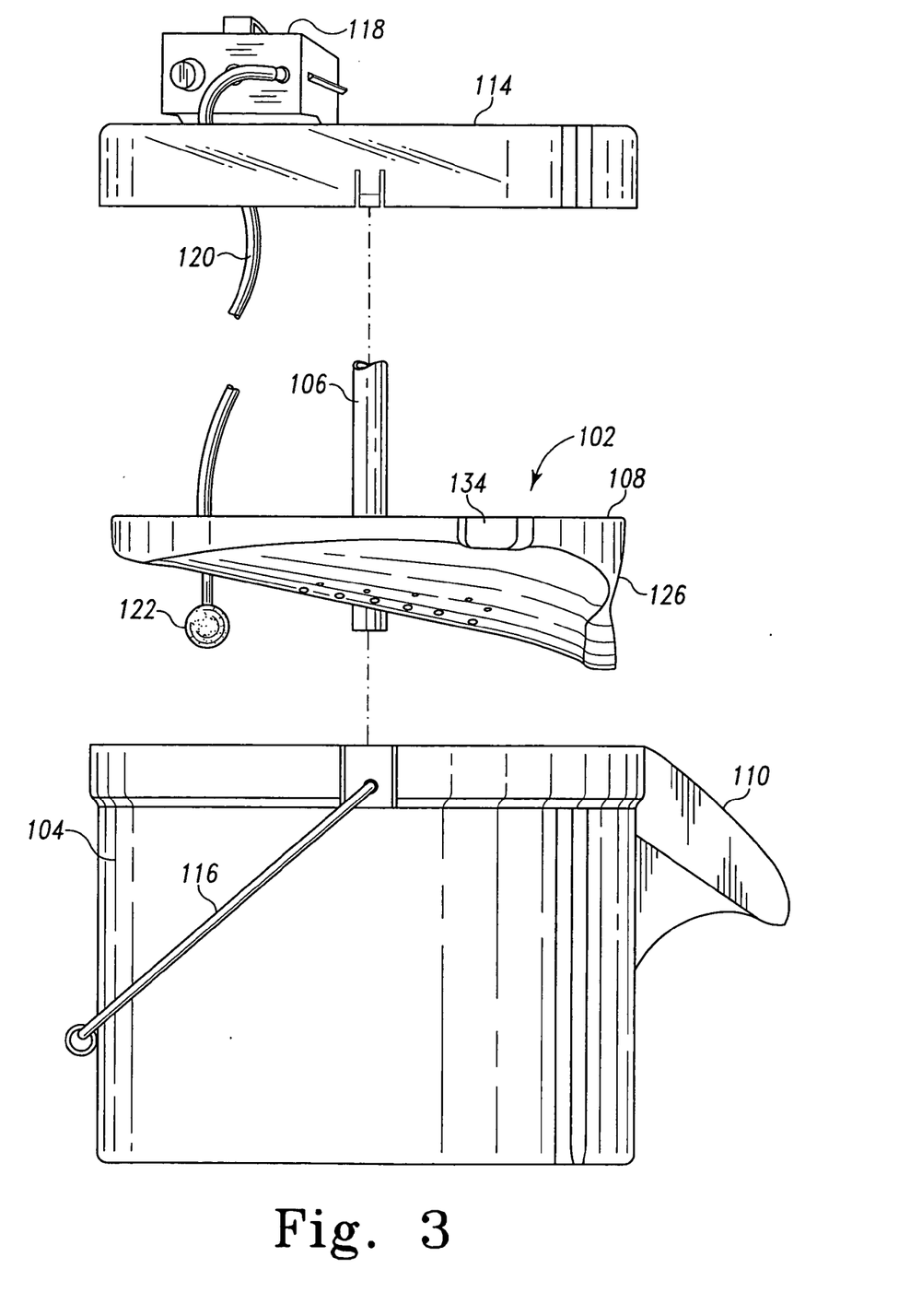
FIG. 3 is a component view of the minnow bucket illustrated in FIG. 1 in which pieces of the minnow bucket are illustrated.

Referring collectively to FIGS. 1–3, the present invention discloses a minnow bucket 100 that includes an automatic dispensing device 102. The minnow bucket 100 includes a bucket base 104 that may be used to hold water and at least one minnow. Preferentially, during use the bucket base 104 would include water and a plurality of minnows. As set forth in greater detail in the sections that follow, the minnow bucket 100 disclosed herein allows an angler to use the automatic dispensing device 102 to selectively dispense minnows while fishing ranging from one minnow to a plurality of minnows.

As best illustrated in FIG. 3, the automatic dispensing device 102 may include a minnow tray handle 106 that may be connected with a minnow tray 108. The automatic dispensing device 102 is designed to fit at least within an inside diameter of the bucket base 104. Preferentially, the automatic dispensing device 102 is optimally designed to fit within the bucket base 104 such that the automatic dispensing device 102 is free to travel up and down in relation to a vertical axis of the bucket base 104 without allowing minnows to escape around the outer edge of the minnow tray 108 in relation to an inside edge of the bucket base 104. Those skilled in the art should recognize that the bucket base 104 may come in several different shapes and sizes as may the shape of the minnow tray 108. It is important to note that the shape and size of the bucket base 104 may somewhat mimic the shape and size of the minnow tray 108 so that minnows do not escape from edges of the minnow tray 108 during use.

In some embodiments of the present invention, the bucket base 104 may include a base dispenser chute 110 that allows minnows to travel out of the bucket base 104. In order to use the present invention, the angler first places the minnow tray 108 inside the bucket base 104, which may or may not include water at that time. If no water has previously been added, the angler may place water in the bucket base 104 that may contain a plurality of minnows. If no minnows have previously been added, the angler may add minnows at this time. To obtain a minnow, the angler may grab the minnow tray handle 106 and raise the minnow tray handle 106 in a vertical direction until a bottom portion of the minnow tray 108 reaches a predetermined point on the bucket base 104. At the predetermined point, the minnow tray 108 reaches an opening 112 in the bucket base 104 and/or the lid 114 that allows the minnows to exit the bucket base 104. The minnows exit through the opening 112 and travel down the base dispenser chute 110 until they reach the angler's hand.

Referring collectively again to FIGS. 1–3, the minnow bucket 100 may include a lid 114 that may be connected with a top portion of the bucket base 104. The lid 114 may be connected with the bucket base 104 using various removable connection methods known to those skilled in the art such as by a friction fit, a clamping mechanism or device, by use of a handle 116 of the bucket base 104 engaging a portion of the lid 114 and so forth. The handle of the bucket base 104 may be used to carry the minnow bucket 100. For the purpose of the present invention, it is important to note that the lid 114 is preferentially removably connected with the bucket base 104. This allows easy access for the angler to stock, clean and store the bucket base 104.

The minnow bucket 100 may also include an air pump 118 that is used to aerate the water that may be placed in the bucket base 104. Minnows that are placed within the bucket base 104 may live longer and remain healthier if the water in which they are placed is aerated. The air pump 118 may include a hose 120 that is connected with an output of the air pump 118. Referring to FIG. 3, the hose 120 from the air pump 118 may also be connected with an air diffuser 122. The air diffuser 122 is used to create air bubbles that are passed on to the water from the air pump 118, thereby placing more oxygen in the water.

Figure 4:
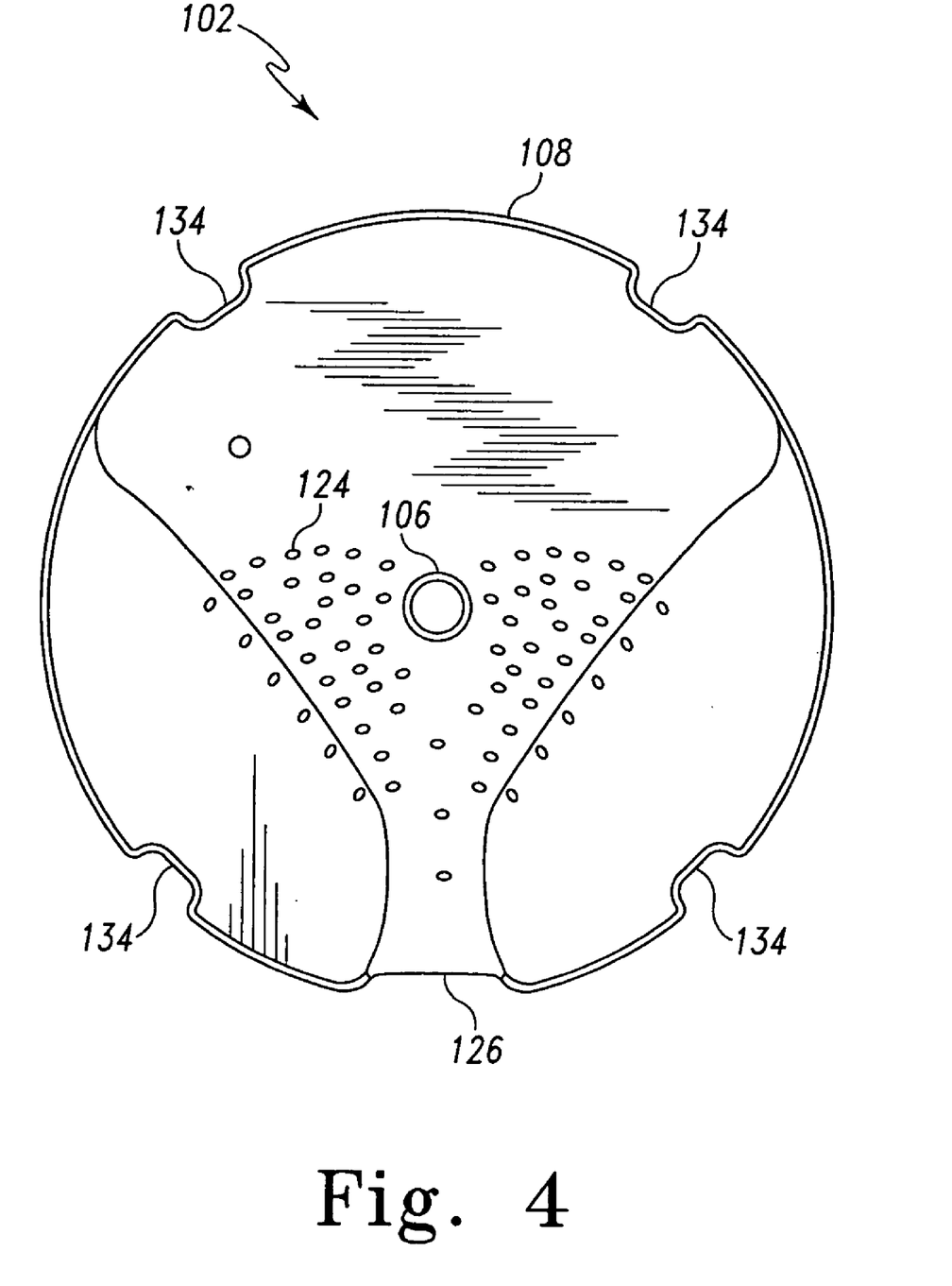
FIG. 4 is a top view of a minnow handle.

Referring to FIG. 4, a top view of the automatic dispensing device 102 is illustrated. As previously set forth, the automatic dispensing device 102 includes a minnow tray handle 106 that is connected with a minnow tray 108. The minnow tray 108 may include a plurality of apertures 124 that are designed to allow water to pass through the minnow tray 108 when the minnow tray 108 is being raised on a vertical axis in relation to the bucket base 104.

Figure 5:
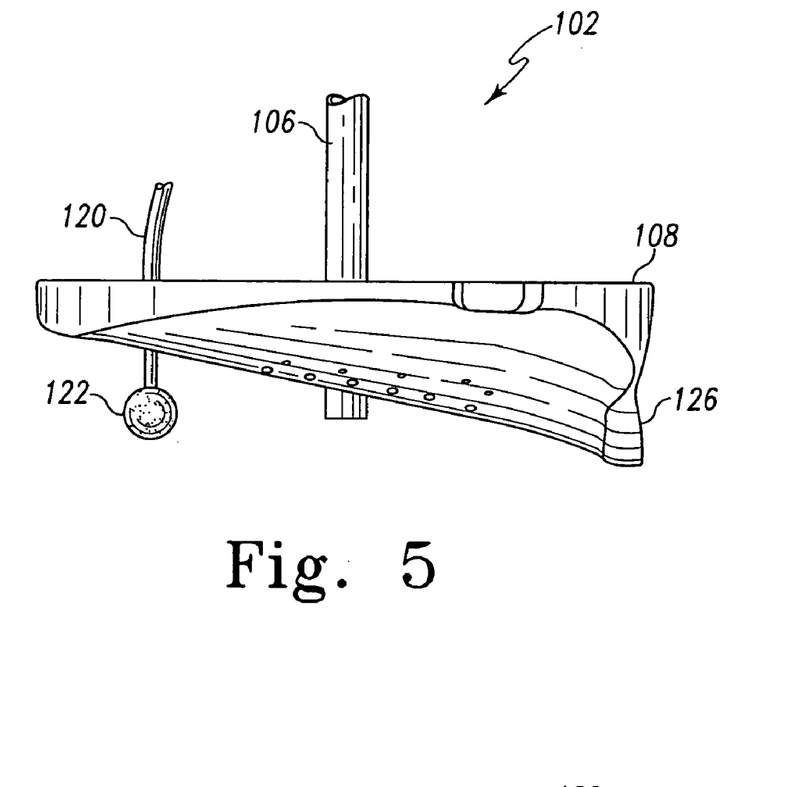
FIG. 5 is a side view of the minnow handle.
Figure 6:
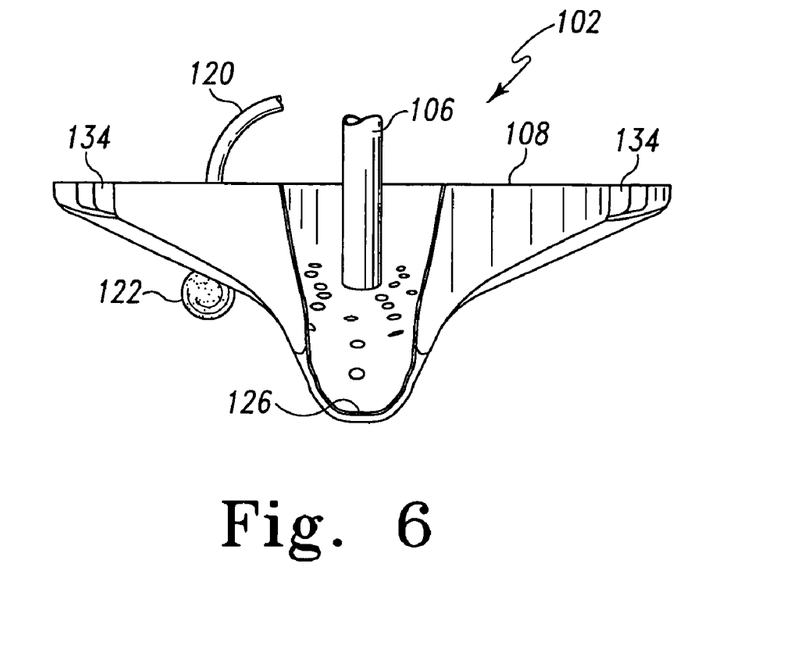
FIG. 6 is a front view of the minnow handle.

As illustrated better in FIGS. 5 and 6, the preferred minnow tray 108 may be formed in a relatively concave shape so that water is directed to a minnow tray opening 126. The minnow tray 108 is formed in a concave shape so that water will flow downwardly toward the tray opening 126. As such, as the minnow tray 108 is lifted out of the water in the bucket base 104, the water containing the fish flows downwardly toward the minnow tray opening 126 and then exits down the base dispenser chute 110. In addition, water drains back into the bucket base 104 through the apertures 124 in the minnow tray 108. However, the size of the apertures 124 in the minnow tray 108 is preferentially large enough to allow most of the water to flow through the apertures 124 and back into the bucket base 104.

Figure 7:
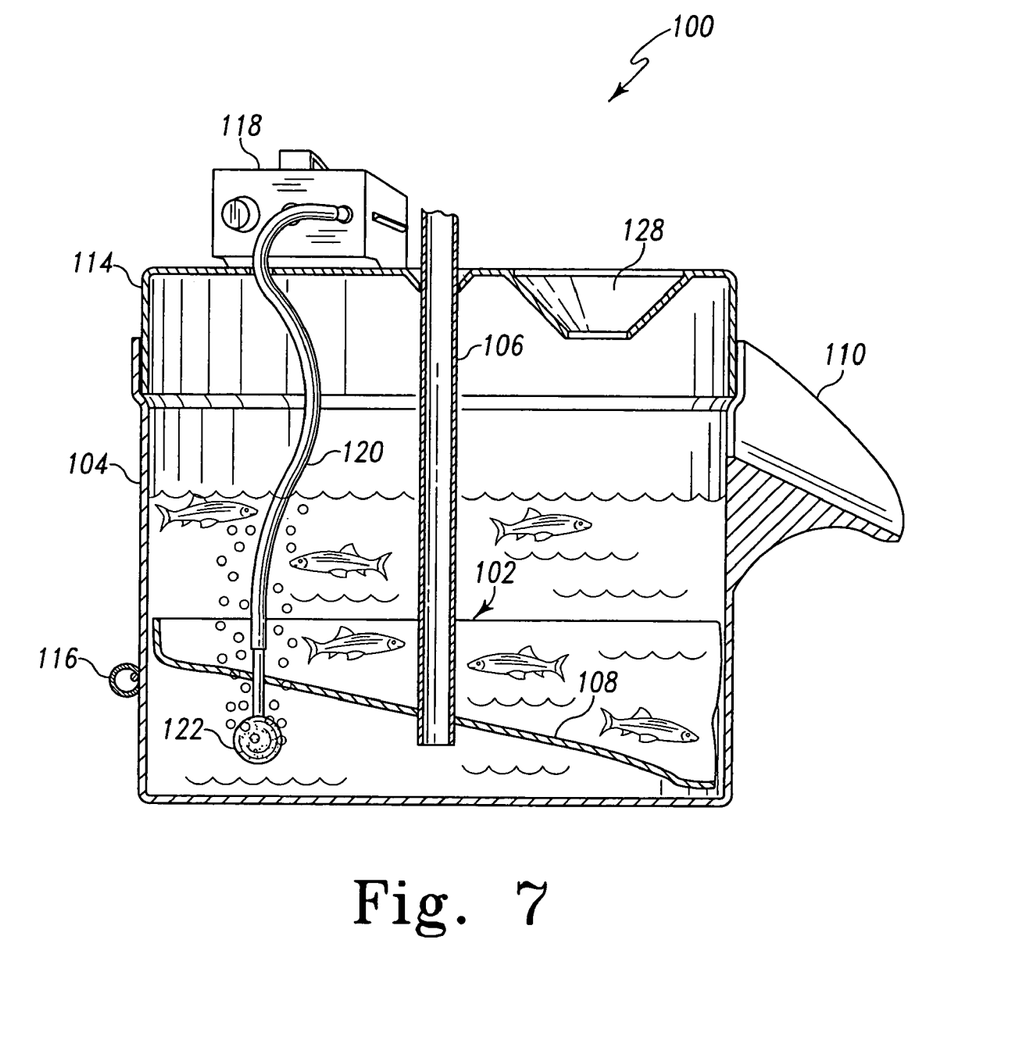
FIG. 7 is a cross-sectional view of the minnow bucket illustrated in FIG. 1.

Referring to FIG. 7, a cross-sectional view of the minnow bucket 100 is illustrated to demonstrate how the minnow bucket 100 functions during use. As illustrated, the minnows have been placed in the water contained in the bucket base 104 and the automatic dispensing device 102 and lid 114 have been positioned in or connected with the bucket base 104. Let's say for instance that the angler needs to get another minnow for bait. The angler would grab the minnow tray handle 106 of the automatic dispensing device 102 with one hand and place the other hand at the exit of the base dispenser chute 110.

Figure 8:
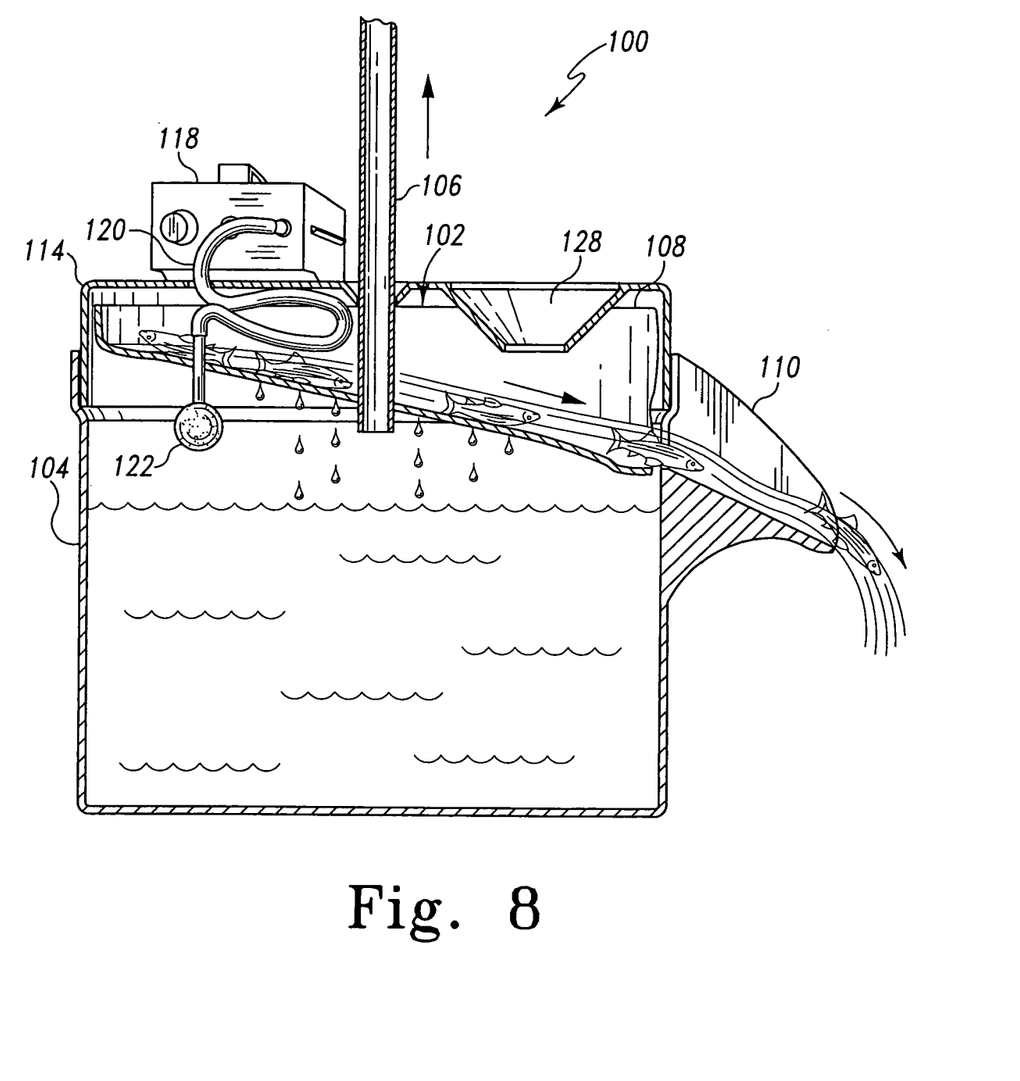
FIG. 8 is a second cross-sectional view of the minnow bucket illustrated in FIG. 1.
Figure 9:
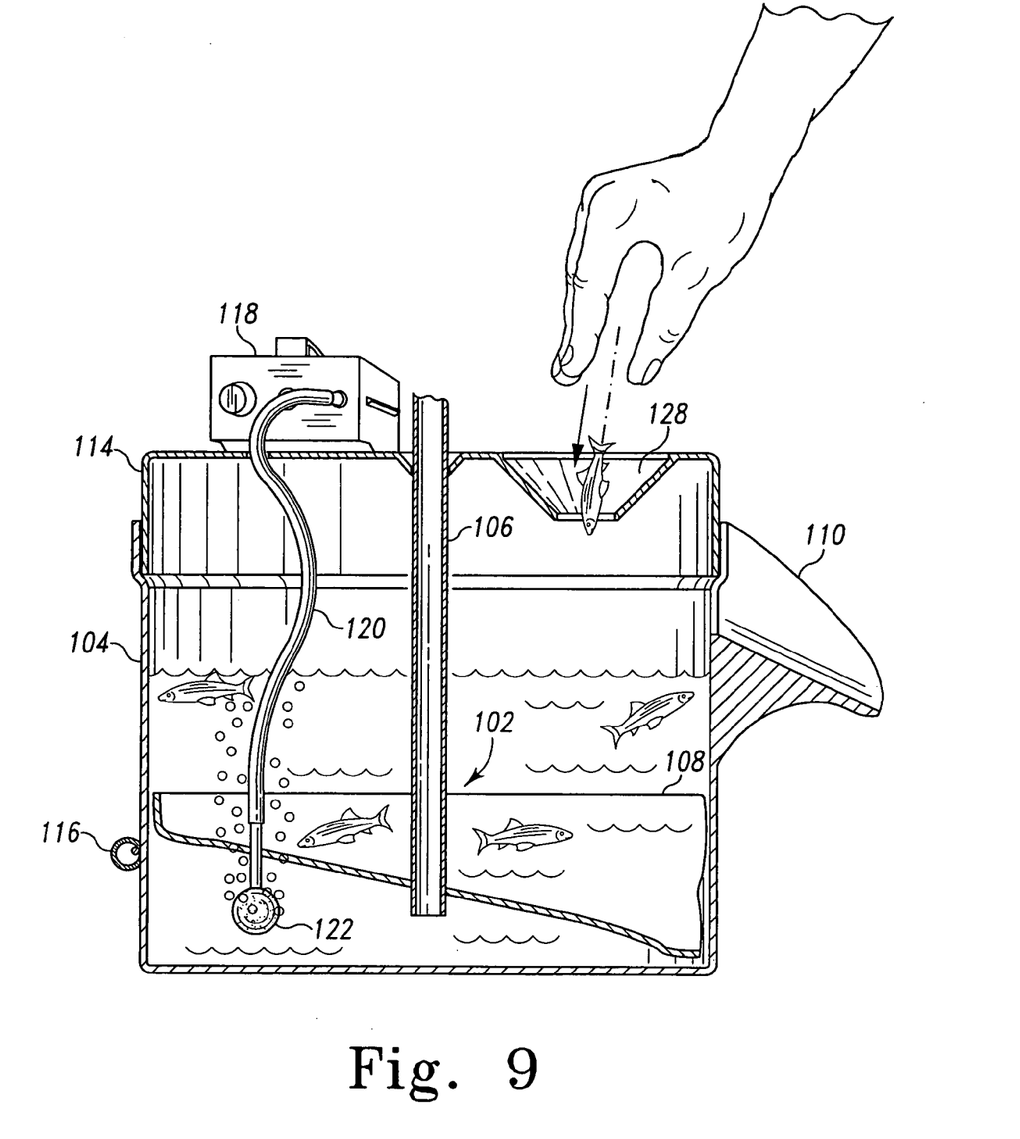
FIG. 9 is a third cross-sectional view of the minnow bucket illustrated in FIG. 1.

Referring to FIG. 8, the angler would then raise the automatic dispensing device 102 to a bottom portion of the base dispenser chute 110 and as illustrated, the minnows begin to travel downwardly with the water toward the minnow tray opening 126. The minnows, and some water, then travel down the dispensing chute 110 into the angler's hand. As such, in order to get a minnow the angler merely needs to raise the automatic dispensing device 102 of the minnow bucket 100 up to a predetermined point and minnows readily begin traveling out of the minnow bucket 100. Referring to FIG. 9, if, by chance, the angler gets more minnows than he/she needs, they may toss the extra minnow(s) back into a minnow return aperture 128 located in the lid 114. The minnow return aperture 128 may be formed in a concave or inwardly facing cone shape in relation to the bucket base 104 and may also be used to stock the minnow bucket 100.

Referring once again to FIG. 1, the lid 114 may also include a handle aperture 130 that allows a portion of the minnow tray handle 106 of the automatic dispensing device 102 to protrude outwardly from the lid 114 in relation to the bucket base 104. The handle aperture 130 provides stability during use and acts as a guide for the minnow tray handle 106. The handle aperture 130 may be formed in several different shapes, but preferentially it is formed having a concave or inverted cone-shape as illustrated in FIG. 1.

The minnow bucket 100 may also include at least one guide rail 132 that is located on an outside wall of the bucket base 104. The guide rails 132 may protrude inwardly toward a center axis if the bucket base 104. Although not specifically illustrated, in the preferred embodiment of the invention the bucket base 104 has four guide rails 132 somewhat equally spaced apart from each other on the bucket base 104. Referring to FIG. 4, the minnow tray 108 may include at least one guide slot 134. The guide rails 132 of the bucket base 104 are designed to fit within the guide slots 134 of the minnow tray 108. As such, the minnow tray 108 will not spin or move around while in the bucket base 104. The lid 114 of the minnow bucket 100 may also include at least one lid guide rail 136. It is important to recognize that the number of guide rails 132, guide slots 134 and lid guide rails 136 used in the present invention may vary.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A minnow bucket, comprising:

a bucket base molded to include a plurality of guide rails and a dispenser chute, wherein the plurality of guide rails extend inwardly from an outside surface of the bucket base, wherein the dispenser chute is positioned on a respective side of the bucket base and extends downwardly and away from the outside surface of the bucket base;

an automatic dispensing device positioned inside the bucket base, wherein the automatic dispensing device comprises a minnow tray connected with a minnow tray handle, wherein the minnow tray is molded having a sidewall and a base, wherein the base has a generally concave shape that slopes downwardly from the sidewall to a minnow tray opening, wherein the base includes a plurality of apertures that allow water to pass through the base of the minnow tray, wherein the sidewall of the minnow tray further includes a plurality of guide slots that extend inwardly in relation to an outside surface of the sidewall for receiving the guide rails of the bucket base, wherein the automatic dispensing device is positioned in the bucket base such that the dispenser chute of the bucket base is aligned on a vertical axis in relation to the minnow tray opening of the minnow tray; and a lid connected with the bucket base molded to include a first opening located on an upper surface of the lid on a central axis in relation to the bucket base, wherein the minnow tray handle extends through the first opening, wherein the lid is also molded to include a second opening that slopes conically downward in relation to the upper surface of the lid to define a minnow return.

2. The minnow bucket of claim 1, further comprising an air pump connected with the lid for aerating water contained in the bucket base, wherein the air pump includes an output hose that is connected with an air diffuser, wherein the output hose passes through a third opening in the lid such that the air diffuser is positioned in the bucket base.

* * * * *